United States Patent [19]

Lewis

[11] 4,296,795
[45] Oct. 27, 1981

[54] PNEUMATICALLY OPERATED CONTROL SYSTEM AND UNIT THEREFOR AND METHODS OF MAKING THE SAME

[75] Inventor: Jay L. Lewis, Knoxville, Tenn.

[73] Assignee: Robertshaw Controls Company, Richmond, Va.

[21] Appl. No.: 146,337

[22] Filed: May 2, 1980

[51] Int. Cl.³ .............................................. F25B 29/00
[52] U.S. Cl. ..................................... 165/27; 236/1 C; 236/91 D
[58] Field of Search ................ 236/1 C, 82, 87, 91 D, 236/47; 165/26, 27

[56] References Cited

U.S. PATENT DOCUMENTS

| | | | |
|---|---|---|---|
| 2,727,691 | 12/1955 | Alyea et al. | 236/47 X |
| 3,047,233 | 7/1962 | Scharpf | 236/47 X |
| 3,140,047 | 7/1964 | Holloway | 236/82 X |
| 3,237,860 | 3/1966 | Jentoft | 236/1 C |
| 3,575,190 | 4/1971 | Puster et al. | 137/85 |
| 3,605,781 | 9/1971 | Joesting | 236/82 X |
| 3,819,113 | 6/1974 | Puster et al. | 236/47 X |

Primary Examiner—William E. Tapolcai, Jr.
Attorney, Agent, or Firm—Candor, Candor & Tassone

[57] ABSTRACT

A pneumatically operated system having a control unit provided with a single inlet interconnected to a one pressure level pneumatic source and having an outlet arrangement interconnected to a pneumatically operated heating and cooling heat exchanger to control the same in either its heating mode or its cooling mode in relation to the pressure value of the pneumatic signal being directed thereto from the control unit through the outlet arrangement thereof, the control unit having a temperature sensing arrangement for controlling the value of the signal in relation to the sensed output temperature of the heat exchanger by operating a bleed arrangement of the control unit. The outlet arrangement comprises a single outlet and the bleed arrangement comprises a single bleed device having an arrangement of parts thereof that is the same regardless of whether the heat exchanger is operating in its heating mode or in its cooling mode whereby the heat exchanger is adapted to be operated in either its heating mode or its cooling mode by the single bleed device without changing the arrangement of the parts of the bleed device and by a one pressure level pneumatic source.

40 Claims, 5 Drawing Figures

PNEUMATICALLY OPERATED CONTROL SYSTEM AND UNIT THEREFOR AND METHODS OF MAKING THE SAME

BACKGROUND OF THE INVENTION

1. Field of the Invention

This invention relates to an improved pneumatically operated heat exchanger system and a self-contained control unit therefor as well as to methods of making such a system and such a control unit.

2. Prior Art Statement

It is known to provide a pneumatically operated system having a control unit provided with a single inlet for being interconnected to a one pressure level pneumatic source and having outlet means interconnected to pneumatically operated heating and cooling heat exchanger means to control the same in either its heating mode or its cooling mode in relation to the pressure value of the pneumatic signal means being directed thereto from the control unit through the outlet means thereof, the control unit having temperature sensing means for controlling the value of the signal means in relation to the sensed output temperature effect of the heat exchanger means by operating bleed means of the control means. Such prior known pneumatically operated heat exchanger system either utilizes two temperature sensors and two outlets on the control unit with a single pressure level source or one temperature sensor and one outlet on the control unit with a two pressure level pneumatic source, one pressure level operating during the cooling mode and the other pressure level operating during the heating mode.

For example of the last-mentioned prior known arrangement, see the U.S. Patent to Puster et al, U.S. Pat. No. 3,819,113.

The U.S. Patent to Puster et al, U.S. Pat. No. 3,819,113, also illustrates in FIG. 1 thereof a pneumatically operated system of the above type wherein a single pressure level source is utilized and only one outlet is provided therefor. In addition, a single temperature sensor is provided for the control system. However, the control system must have the bimetal member thereof physically turned over when the system is being converted from its heating mode to its cooling mode or being changed from its cooling mode to its heating mode.

Applicant is also aware of a control that has one outlet and uses a single pressure level pneumatic source for operating the heat exchanger means except that the control device has two separate temperature sensors, one sensor for controlling the cooling mode and the other sensor for controlling the heating mode.

SUMMARY OF THE INVENTION

It is a feature of this invention to provide an improved pneumatically operated heat exchanger system wherein the control means has a single inlet, a single outlet and a single temperature sensing arrangement to control the heat exchanger means in both its cooling mode and its heating mode while still only utilizing a one pressure level pneumatic source.

It has been found that such a pneumatically operated heat exchanger system is readily effective to conserve energy because the control unit therefor provides a "dead band" temperature range so that neither the heating portion or the cooling portion of the heat exchanger means will be operating as long as the sensed output temperature effect of the heat exchanger means falls within the "dead band" temperature range of the control means.

For example, one embodiment of this invention provides a pneumatically operated system having control means provided with a single inlet interconnected to a one pressure level pneumatic source and having outlet means interconnected to pneumatically operated heating and cooling heat exchanger means to control the same in either its heating mode or its cooling mode in relation to the pressure value of the pneumatic signal means being directed thereto from the control means through the outlet means thereof, the control means having temperature sensing means for controlling the value of the signal means in relation to the sensed output temperature effect of the heat exchanger means by operating bleed means of the control means. The outlet means comprises a single outlet and the bleed means comprises a single bleed device having an arrangement of parts thereof that is the same regardless of whether the heat exchanger means is operating in its heating mode or in its cooling mode whereby the heat exchanger means is adapted to be operated in either its heating mode or its cooling mode by the single bleed device without changing the arrangement of parts of the bleed device and by a one pressure level pneumatic source.

The temperature sensing means comprises a pair of bimetal members for respectively acting on the single bleed device whereby the heat exchanger means is adapted to be operated in its heating mode by one of the bimetal members or in its cooling mode by the other of the bimetal members, the sensor means providing a "dead band" temperature range so that the bleed device will remain in a certain condition thereof to provide the pneumatic signal means with a certain value as long as the sensed output temperature effect falls within the "dead band" temperature range so that the bimetal members will not cause the control unit to operate the heat exchanger means in either its heating mode or its cooling mode as long as the sensed output temperature effect falls within the "dead band" temperature range.

Accordingly, it is an object of this invention to provide an improved pneumatically operated heat exchanger system having one or more of the novel features of this invention as set forth above or hereinafter shown or described.

Another object of this invention is to provide an improved pneumatically operated self-contained control unit for such a system or the like, the control unit of this invention having one or more of the novel features of this invention as set forth above or hereinafter shown or described.

Another object of this invention is to provide an improved method of making such a pneumatically operated heat exchanger system, the method of this invention having one or more of the novel features of this invention as set forth above or hereinafter shown or described.

Another object of this invention is to provide a method of making such a pneumatically operated self-contained control unit, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
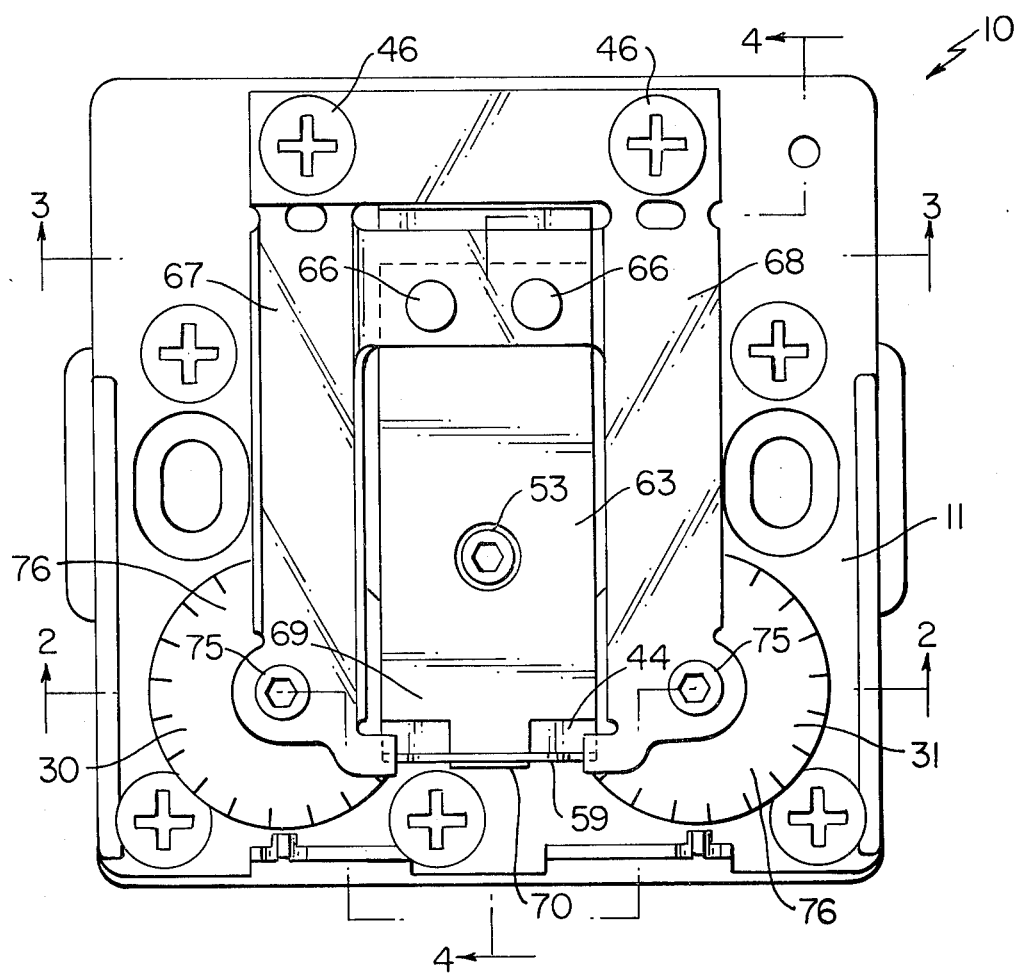
FIG. 1 is a top view of the pneumatically operated control unit of this invention.

While the various features of this invention are hereinafter illustrated and described as being particularly adapted to operate with a pneumatic pressure source, it is to be understood that the various features of this invention can be utilized singly or in any combination thereof to operate with a pneumatic vacuum source as desired.

Therefore, this invention is not to be limited to only the embodiment illustrated in the drawings, because the drawings are merely utilized to illustrate one of the wide variety of uses of this invention.

Figure 2:
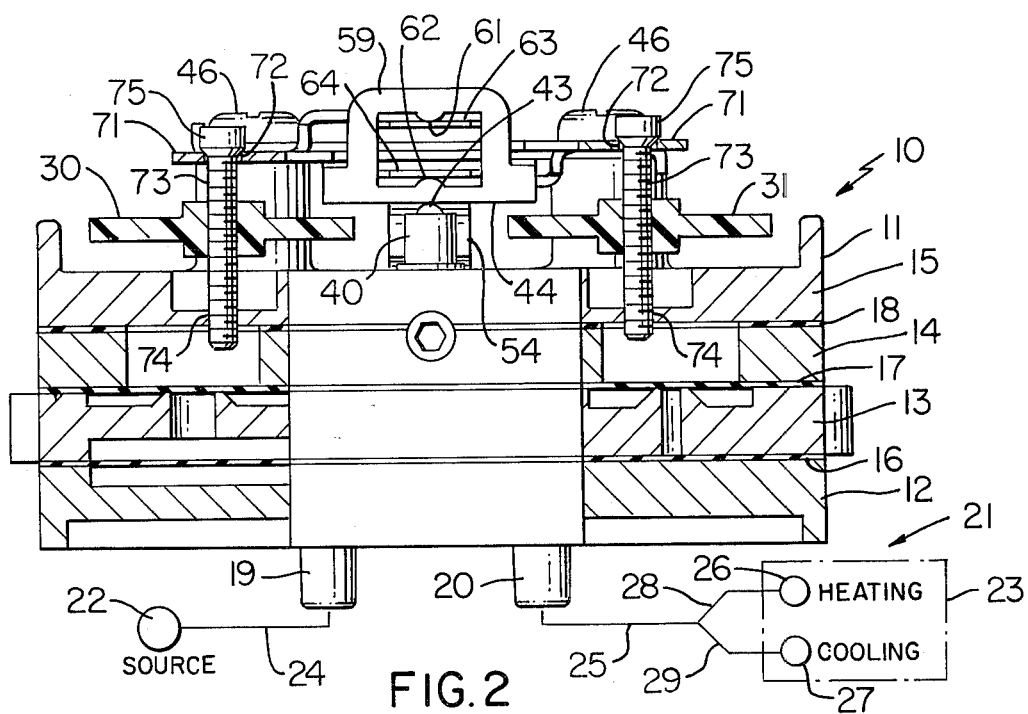
FIG. 2 is a cross-sectional view taken on line 2—2 of FIG. 1 and illustrates schematically the pneumatic control system utilizing the control unit of FIG. 1.

Referring now to FIGS. 1 and 2, the improved pneumatically operated control unit or thermostat of this invention is generally indicated by the reference numeral 10 and comprises a housing means 11 formed from a plurality of housing plates 12, 13, 14 and 15 disposed and secured in stacked relation with suitable diaphragm means 16, 17 and 18 disposed therebetween to seal the housing plates 12-15 together as well as provide sealing means and diaphragm means for the various chambers and channels formed in the housing plates 12-15 in a manner well known in the art.

The housing means 11 has only two nipples 19 and 20 extending from the lower housing plate 12 thereof and respectively being provided with passage means therein, the nipple 19 being an inlet nipple and the nipple 20 being an outlet nipple to readily permit the control unit 10 to be interconnected into the pneumatic control system of this invention that is generally indicated by the reference numeral 21 in FIG. 2 and comprising a one pressure level pneumatic source 22 and a pneumatically operated heating and cooling heat exchanger means 23. The inlet nipple 19 is interconnected to the pneumatic pressure source 22 by a suitable conduit means 24 and the outlet nipple 20 is interconnected to the heat exchanger means 23 by a suitable conduit means 25.

The pneumatically operated heat exchanger means 23 has a pneumatically operated control device or valve 26 which operates the heating mode or cycle of the heat exchanger means 23 when the same receives a pneumatic signal from the control device 10 that is below a predetermined "dead band" pressure range of the control device 10 as will be apparent hereinafter.

Similarly, the heat exchanger means 23 has a pneumatically operated control device or valve 27 which operates the heat exchanger means 23 in its cooling mode or cycle when the same receives a pneumatic signal having a pressure value above the aforementioned "dead band" pressure range of the control device 10.

The conduit means 25 leading from the outlet nipple 20 of the control unit 10 has a branch 28 thereof leading to the control device 26 and a branch thereof leading to the control device 27 of the heat exchanger means 23 whereby both control devices 26 and 27 will sense the pressure of the pneumatic signal exiting from the control unit 10.

In the operation of the pneumatically operated heat exchanger system 21 utilizing the pneumatically operated control unit 10 of this invention, the control unit 10 is adapted to be set with a "dead band" temperature range in a manner hereinafter set forth so that the control unit 10 will produce an output pneumatic signal of a pressure value that falls between the pressure values required for operating either the heating control device 26 or the cooling control device 27 of the heat exchanger means 23 as long as the temperature being sensed by the control unit 10 falls within that "dead band" temperature range. For example, the control unit 10 can be set in a manner hereinafter set forth, to only cause the control device 26 to operate the heating cycle of the heat exchanger means 23 when the output temperature effect of the heat exchanger means 21 being sensed by the control unit 10 is below 65° F. Conversely, the control unit 10 will only cause the control device 27 of the heat exchanger means 23 to operate the same in its cooling mode when the output temperature effect of the heat exchanger means 23 being sensed by the control unit 10 is about 75° F. whereby it can be seen that in this example the "dead band" temperature range for the system 21 is a total of 10° F. and falls between 65° F. and 75° F. Thus, as long as the temperature of the space being monitored by the control unit or thermostat 10 falls within that "dead band" temperature range, and heat exchanger means 23 is in an off condition thereof and thereby is conserving energy.

However, when the output temperature being sensed by the control unit 10 falls below 65° F. the control unit 10, in a manner hereinafter set forth, produces a pneumatic signal in the output nipple 20 that has a value below the normal "dead band" pressure value to cause just the control device or valve 26 to operate the heat exchanger means 23 in its heating mode or cycle. Conversely, when the control unit 10 senses an output temperature effect above 75° F. the control unit 10 causes the pneumatic signal in the output nipple 20 to be of a pressure value above the normal "dead band" pressure value and of a value that will cause just the control device 27 to operate the heat exchanger means 23 in its cooling cycle or mode.

Therefore, by selecting a span of actuating pressure values of the pneumatic signal to be directed to the heat exchanger means 23, the heat exchanger means 23 will never have both control devices 26 and 27 being operated at the same time.

The control unit 10 of this invention is self-contained and is a proportioning-type, single branch, two temperature, pneumatic room thermostat that is particularly designed to conserve energy, the control unit or thermostat 10 having two set point dials or selector means 30 and 31 for respectively setting the set point temperatures for the heating cycle or mode of the heat exchanger means 23 and for the cooling cycle or mode for the heat exchanger means 23.

In particular, the set point dial or selector means 30 and 31 can be set to have the heating and cooling temperatures a desired number of degrees apart so that when the conditioned space has a temperature between such selected heating and cooling control point, no energy will be used because the heat exchanger means 23 is in its off condition.

Therefore, if the heating and cooling control devices or valves 26 and 27 are positively sequenced, and since the control unit or thermostat 10 is a single branch thermostat, the control system 21 of this invention has the distinct advantage that both heating and cooling valves or devices 26 and 27 of the heat exchanger means 23 can never be opened at the same time.

Another advantage of this invention is that the heating and cooling temperature set points may be independently selected so as to provide a "dead band" temperature range that is particularly suitable to the user. Also, by using a mechanical means of creating an energy saving "dead band", the thermostat unit 10 of this invention is adapted to replace any two pipe non-energy saving thermostat on applications where suitable control valves or devices 26 and 27 have been installed.

Figure 3:
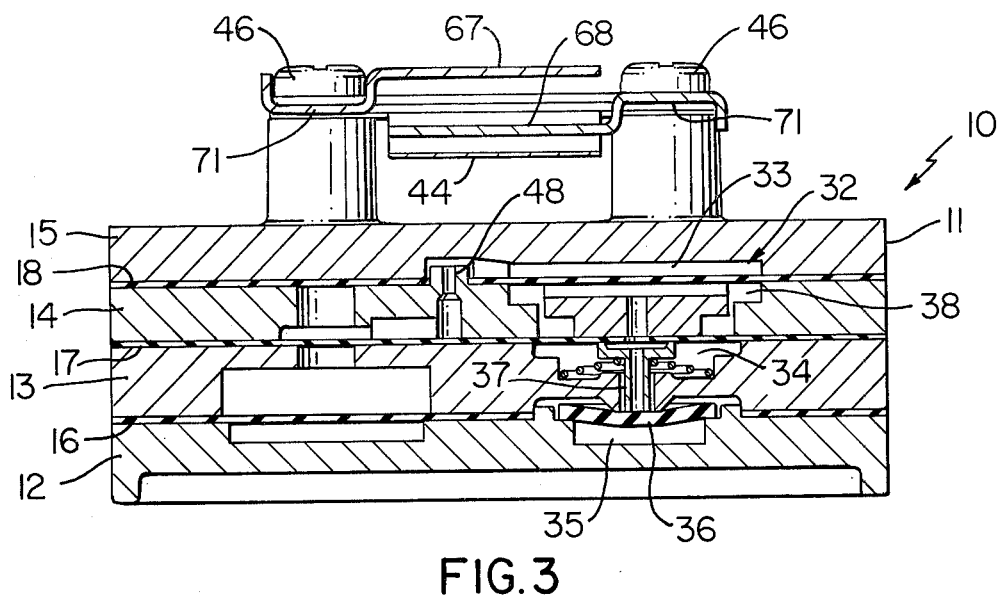
FIG. 3 is a cross-sectional view taken on line 3—3 of FIG. 1.

The housing means 11 of the control unit 10 contains a pneumatically operated relay that is generally indicated by the reference numeral 32 in FIG. 3 and it is of a type that is fully illustrated and described not only in the U.S. Patent to Puster et al, U.S. Pat. No. 3,575,190, but also in the afore-mentioned U.S. Patent to Puster, U.S. Pat. No. 3,819,113. Thus, these two U.S. Patents are incorporated herein by reference as the same can be utilized for fully understanding the details and operation of the pneumatic relay means 32 so that the particular details thereof need not be repeated in this application.

However, in general, the pneumatic relay 32 has a pilot pressure chamber 33 for receiving a pressure signal that causes the relay 32 to produce a certain branch pressure signal from a branch chamber 34 thereof that is directed to the output nipple 20 whereby the value of such branch pressure is substantially proportional to the value of the pneumatic signal being directed to the pilot chamber 33 thereof in a manner well known in the art and as fully disclosed by the afore-mentioned two U.S. Patents of Puster et al and Puster.

The pneumatic pressure from the source 22 being directed to the inlet nipple 19 is directed by suitable internal passage means in the housing means 11 of the control unit 10 to a pressure chamber 35 of the relay 32 and is adapted to have a portion thereof directed into the branch chamber 34 to create the branch pressure under the control of a flexible valve member 36 and a movable valve member 37 of the relay 32 that is adapted to cooperate with a vent chamber 38 of the relay means 32 to either vent the branch chamber 34 to the vent chamber 38 or interconnect the branch chamber 34 to the pressure chamber 35 depending upon the pressure value of the pneumatic signal being directed to the pilot chamber 33. Thus, the relay 32 will produce a branch pressure signal from the branch chamber 34 that is substantially proportional to the pneumatic signal being directed to the pilot chamber 33.

Figure 4:
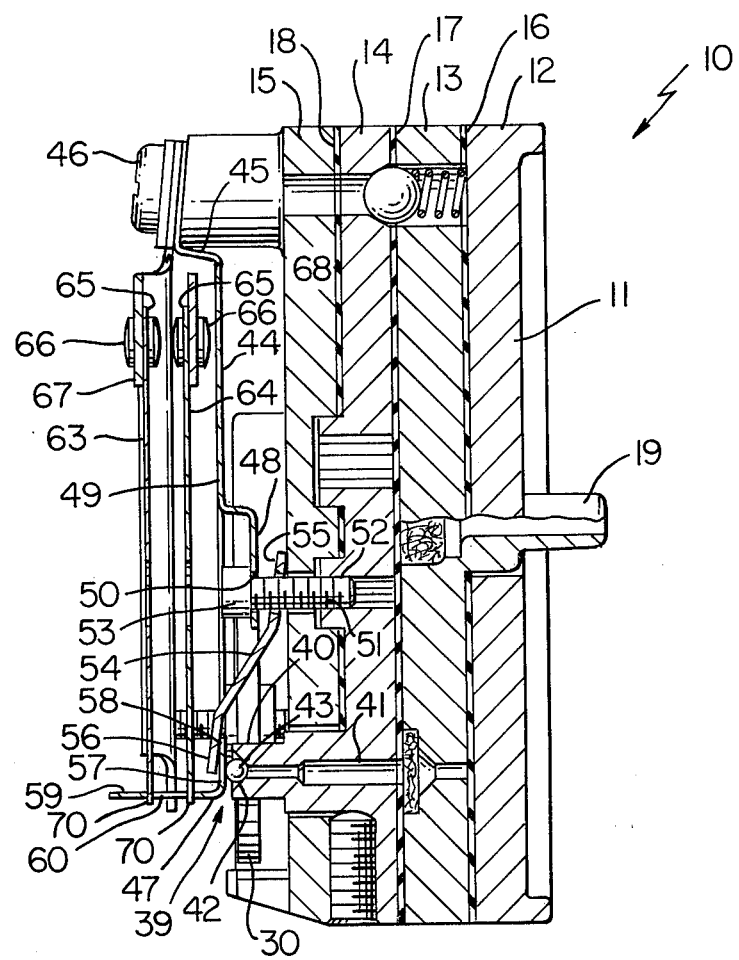
FIG. 4 is a cross-sectional view taken on line 4—4 of FIG. 1.

The control unit 10 has a single bleed or vent valve arrangement that is generally indicated by the reference numeral 39 in FIG. 4 and comprises a tubular projection 40 of the housing means 11 that has a passage means 41 therein that leads to the pilot pressure chamber 33 of the relay means 32 and to a frusto-conical valve seat 42 of the tubular member 40 that is adapted to interconnect the valve seat 42 to the atmosphere. However, a ball valve member 43 is disposed against the valve seat 42 and is normally urged against the valve seat 42 to close the valve seat 42 by the force of a leaf spring 44 having one end 45 secured to the housing means 11 by suitable fastening means 46 to cantilever the leaf spring 44 thereto whereby the other end 47 of the leaf spring 44 bears against the ball valve member 43 and has a natural bias in a direction to tend to hold the ball valve member 43 in its closed condition against the valve seat 42.

Thus, in a manner well known in the art, when the pressure source 22 is interconnected to the control unit 10, the same feeds through suitable orifice means, such as orifice means 48 illustrated in FIG. 3, to the pilot pressure chamber 33 and has a certain pressure value that acts against the ball valve member 43 to tend to urge the ball valve member 43 off of the valve seat 42 in opposition to the force of the leaf spring 44 so that the leaf spring 44 normally tends to maintain a certain pressure value in the pilot pressure chamber 33 by allowing a certain rate of bleed through its bleed valve arrangement 39 when the leaf spring 44 only has its natural bias tending to hold the ball valve member 43 against the valve seat 42.

The resulting pressure value of the pressure fluid in the pilot pressure chamber 33 is such that the same causes the relay means 32 to produce a branch pressure value in the branch chamber 34 that is being directed by the nipple 20 to the heat exchanger means 23 at a pressure value that falls within the "dead band" pressure range so that neither the heating device 26 or cooling device 27 will be operated as will be apparent hereinafter.

The leaf spring 44 has a tongue 48 carved and bent from the medial portion 49 thereof and is provided with an opening 50 therethrough to receive a threaded adjusting member 51 therethrough and being threaded in a suitable threaded bore 52 in the housing means 11 whereby an enlarged head 53 of the adjusting member 51 abuts against the tongue 48. In this manner, the normal biasing force of the leaf spring member 44 acting against the ball valve member 43 can be adjusted by the adjusting member 51 in order to select the "dead band" pressure value that will be produced by the relay means 32 in the branch chamber 34 as long as the leaf spring 44 is acting on the ball valve member 43 without any additional force being imposed thereon or subtracted therefrom as will be apparent hereinafter.

In order to dampen vibrations of the leaf spring 44, a small lever 54 has one end 55 loosely mounted on the adjusting member 51 intermediate the tongue 48 of the leaf spring 44 and the housing means 11 while the other end 56 of the lever 54 is disposed against the side 57 of the part 58 of the leaf spring 44 which engages against the ball valve member 43. In this manner, the loosely mounted lever 54 dampens vibrations of the leaf spring 44 tending to maintain the ball valve member 43 against the valve seat 42.

The end 47 of the leaf spring 44 has an outturned flange 59 provided with an opening 60 therethrough which defines a pair of opposed arcuate abuttments 61 and 62 to be respectively acted upon by a pair of bimetal members 63 and 64 of the control unit 10 in a manner hereinafter described.

The bimetal members 63 and 64 have one end 65 thereof respectively fastened by suitable fastening means 66 to adjustable levers 67 and 68 respectively fastened to the housing means 11 by the afore-mentioned fastening members 46 that also fasten the leaf spring 44 thereto.

In this manner, the bimetal members 63 and 64 are disposed in cantilevered fashion to the housing means 11 and can have their fixed ends 65 adjusted by the selector means 30 and 31 which respectively act on the levers 67 and 68 in a manner hereinafter described to set the afore-mentioned control temperatures of the "dead band" temperature range.

Each bimetal member 63 and 64 has the other end 69 thereof provided with an outwardly directed tongue 70 that is adapted to project through the opening 60 of the leaf spring 44 to cooperate therewith in a lost motion manner as will be apparent hereinafter to respectively adjust the force of the leaf spring 44 acting on the ball valve member 43 only when the respective bimetal member 63 or 64 is sensing an output temperature effect outside the "dead band" temperature range as will be apparent hereinafter.

Each lever 67 and 68 has an arm 71 provided with an opening 72 therethrough which receives a threaded fastening member 73 therethrough that is threaded in a suitable threaded opening 74 in the housing means 11 whereby enlarged heads 75 of the threaded fastening members 43 respectively abut against the arms 71 of the levers 67 and 68 to control the position of the arms 71 relative to the housing means 11 and, thus, the setting of the bimetal members 63 and 64.

The selector dials or means 30 and 31 are respectively secured to the threaded fastening members 73 so that when the dials 30 and 31 are rotated, the dials 30 and 31 change the threaded relation of the threaded members 73 with the housing means 11 and, thus, the position of the arms 71 relative to the housing means 11 so that the cantilevered positions of the bimetal members 63 and 64 will be adjusted relative to the housing means 11 to select the temperature setting thereof as will be apparent hereinafter.

Figure 5:
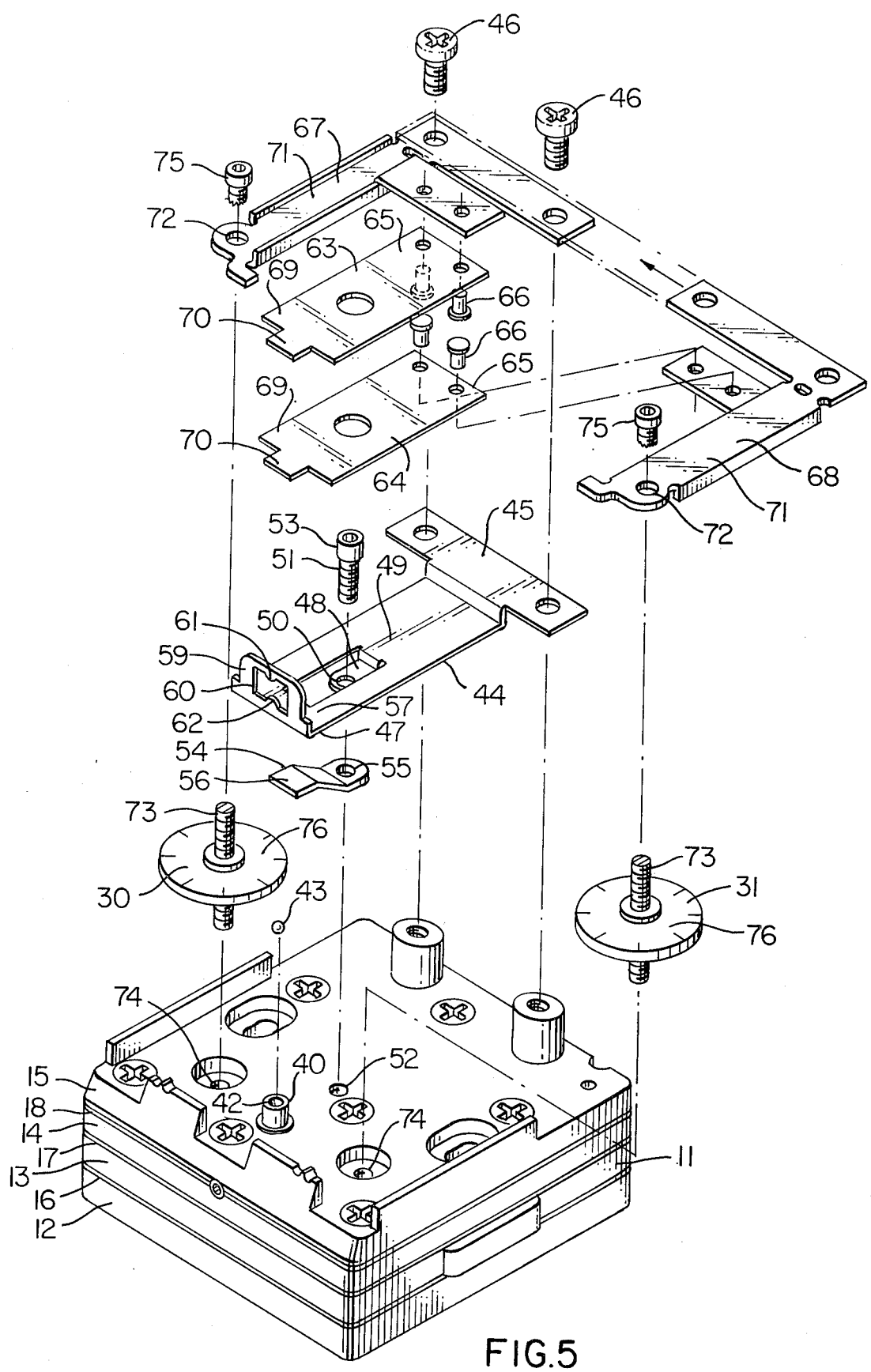
FIG. 5 is an exploded perspective view illustrating certain parts of the control unit of FIG. 1.

The adjustable levers 67 and 68 comprise identical members one of which is inverted relative to the other as illustrated in FIG. 5 and the bimetal members 63 and 64 are also identical and both warp upwardly as in FIG. 2 upon an increase in sensed temperature and warp downwardly upon a decrease in sensed temperature whereby the bimetal member 63 is for controlling the heating cycle of the heat exchange system 21 and the bimetal member 64 is for controlling the cooling operation of the heat exchange system 21 as will be apparent hereinafter.

Thus, by placing appropriate markings on the exposed sides 76 of the indicator dials 30 and 31, an operator can rotate the selector means 30 and 31 to respectively set the set point temperatures that the bimetal members 63 and 64 are respectively adapted to have their ends 70 act against the respective abutment means 61 and 62 of the leaf spring 44 to control the heating and cooling cycle of the heat exchanger means 23 on each side of the "dead band" temperature range as will be apparent hereinafter.

Therefore, it can be seen that the control unit 10 of this invention can be formed from a relatively few parts in a relatively simple manner to have only a single inlet 19 and a single outlet 20 to provide a "dead band" energy saving control of a heat exchanger means 23 in a manner now to be described.

When the control unit 10 of this invention has its inlet nipple 19 interconnected to the one pressure level pneumatic source conduit 24 and its outlet nipple 20 interconnected to the outlet conduit 25 that leads to the heat exchanger means 23, the control device 10 having been previously set through the adjusting member 51 to normally provide a branch pressure signal through the outlet conduit 25 to the heat exchanger means 23 with a pressure value that falls between the pressure values that respectively operate the control devices or valves 26 and 27 as long as the output temperature effect sensed by the control unit 10 falls within a "dead band" range as set by the selector means 30 and 31, the pressure being maintained by the leaf spring 44 on the vent valve means 39 for the pilot control chamber 33 of the relay 32 is such that the vent valve means 39 through the relay 32 maintains an output branch pressure in the branch chamber 34 of a value that will not operate either of the control devices 26 and 27.

The operator of the device 10 can select the span of the "dead band" temperature range by rotating the selector means 30 and 31. For example, the operator can rotate the selector means 30 to determine that the heat exchanger 23 is not to be operated in its heating cycle unless the temperature falls below the set temperature of 65° F. Likewise, the operator can move the selector means 31 to a desired temperature setting such as 75° F. so that the heat exchanger 23 will not be operated in its cooling cycle unless the sensed output temperature effect is above 75° F.

Thus, as long as the output temperature effect being sensed by the control device 10 falls within the "dead band" temperature range of 65° F. to 75° F., the tongues 70 of the free ends 69 of the bimetal members 63 and 64 are in a lost motion position within the opening 60 of the end 47 of the leaf spring 44 so that the leaf spring 44 will maintain the output branch pressure at that pressure value which is intermediate the operating conditions for the control devices or valves 26 and 27 of the heat exchanger means 23 so that the heat exchanger means 23 will be in its "off" and, thus, in its energy saving condition.

However, should the temperature in the area being monitored by the control unit 10 fall below 65° F., such lowering of temperature will cause the bimetal member 63 to warp upwardly and thereby have its tongue 70 engage against the abuttment 61 of the leaf spring 44 to tend to move the same away from the ball valve member 43 with a certain force so that the amount of bleed through the vent means 39 is increased to lower the pressure value of the pneumatic signal being directed to the pilot chamber 33 of the relay means 32. With this decrease in the pressure value of the pressure fluid in the pilot chamber 33 of the relay 32, the relay 32 now decreases the pressure value being produced in the branch chamber 34 in the manner fully set forth in the afore-mentioned U.S. Patent to Puster et al, U.S. Pat. No. 3,575,190 and the U.S. Patent to Puster, U.S. Pat. No. 3,819,113 whereby the pressure value of the pneumatic signal being delivered to the outlet conduit 25 will fall to a value that will cause the control device or valve 26 to now operate and thereby operate the heat exchanger means 23 in its heating cycle or mode until the output temperature effect again rises above 65° F.

Conversely, should the output temperature effect being monitored by the control unit 10 rise above 75° F., such sensed temperature causes the bimetal member 64 to warp downwardly in such a manner that the tongue 70 thereof bears against the abutment 62 of the leaf spring 44 with a certain force adding to the force of the leaf spring 44 tending to maintain the ball valve member 43 in its closed condition so that the amount of bleed through the vent means 39 is decreased to thereby increase the pressure value of the fluid in the pilot chamber 33 of the relay 32. This increase in the pressure value of the pressure fluid in the pilot chamber 33 of the relay 32 causes a corresponding increase in the value of the branch pressure in the branch chamber 34 and, thus, an increase in the pressure value of the pressure fluid being directed to the outlet conduit 25. When this increased pressure value reaches the pressure value that causes the control device or valve 27 to be operated, the control device 27 causes the heat exchanger means 23 to operate in its cooling cycle or mode and thereby tend to decrease the temperature in the area being monitored by the control unit 10. Once that monitored temperature again falls below the selected temperature of 75° F., the relay 32 will cause the pressure value of the branch signal pressure to fall to a value that will permit the control device 27 to cease operating the heat exchanger means 23.

Accordingly, it can be seen when neither heating or cooling is required from the exchanger means 23, the heating and cooling bimetal members 63 and 64 move in a free space in the opening 60 of the leaf spring 44 and thereby do not act on the "dead band" lever or spring 44 so that the output branch pressure remains stable as held by the "dead band" leaf spring 44.

Therefore, it can be seen that this invention not only provides an improved pneumatically operated heat exchanger system and method of making the same, but also this invention provides an improved self-contained pneumatically operated control unit for such a system and method of making the same.

While the forms and methods of this invention now preferred have been illustrated and described as required by the Patent Statute, it is to be understood that other forms and method steps can be utilized and still fall within the scope of the appended claims.

What is claimed is:

1. In a pneumatically operated system having control means provided with a single inlet interconnected to a one pressure level pneumatic source and having outlet means interconnected to pneumatically operated heating and cooling heat exchanger means to control the same in either its heating mode or its cooling mode in relation to the pressure value of the pneumatic signal means being directed thereto from said control means through said outlet means thereof, said control means having temperature sensing means for controlling said value of said signal means in relation to the sensed output temperature effect of said heat exchanger means by operating bleed means of said control means, the improvement wherein said outlet means comprises a single outlet and said bleed means comprises a single bleed device having an arrangement of parts thereof that is the same regardless of whether said heat exchanger means is operating in its heating mode or in its cooling mode whereby said heat exchanger means is adapted to be operated in either its heating mode or its cooling mode by said single bleed device without changing said arrangement of said parts of said bleed means.

2. In a pneumatically operated system having control means provided with a single inlet interconnected to a one pressure level pneumatic source and having outlet means interconnected to pneumatically operated heating and cooling heat exchanger means to control the same in either its heating mode or its cooling mode in relation to the pressure value of the pneumatic signal means being directed thereto from said control means through said outlet means thereof, said control means having temperature sensing means for controlling said value of said signal means in relation to the sensed output temperature effect of said heat exchanger means by operating bleed means of said control means, the improvement wherein said outlet means comprises a single outlet and said bleed means comprises a single bleed device whereby said heat exchanger means is adapted to be operated in either its heating mode or its cooling mode by said single bleed device, said sensing means having means providing a "dead band" temperature range so that said bleed device will remain in a certain condition thereof to provide said signal means with a certain value as long as said sensed output temperature effect falls within said "dead band" temperature range.

3. A system as set forth in claim 2 wherein said means providing said "dead band" range is adjustable to increase or decrease said "dead band" range.

4. A system as set forth in claim 2 wherein said means providing said "dead band" range includes a pair of bimetal members respectively for use in connection with said heating mode and said cooling mode of said heat exchanger means.

5. A system as set forth in claim 2 wherein said bleed device includes a leaf spring and a vent valve member engaged by said leaf spring to tend to normally provide said certain condition.

6. A system as set forth in claim 5 wherein said means providing said "dead band" range includes a pair of bimetal members operatively associated with said leaf spring and being adaptable to be engageable therewith.

7. A system as set forth in claim 6 wherein said leaf spring has lost motion means operatively interconnecting said bimetal members and said leaf spring together.

8. A system as set forth in claim 7 wherein said lost motion means comprises opening means through said leaf spring, said bimetal members projecting through said opening means to either engage said leaf spring or be spaced therefrom in said opening means.

9. A system as set forth in claim 8 wherein said leaf spring has opposed ends one of which is secured to said control means to cantilever said leaf spring thereto, the other of said ends of said leaf spring engaging said vent valve member and having said opening means therethrough, each bimetal member having opposed ends one of which is secured to said control means to cantilever the respective bimetal member thereto, the other of said ends of each bimetal member projecting through said opening means, said bimetal members being disposed in spaced apart and parallel relation to each other and to said leaf spring.

10. A system as set forth in claim 9 and including a pair of selector means carried by said control means and being respectively operatively interconnected to said bimetal members to adjust the same and thereby select the span of said "dead band" temperature range.

11. In a pneumatically operated system having control means provided with inlet means interconnected to pneumatic source means and having outlet means interconnected to pneumatically operated heating and cooling heat exchanger means to control the same in either of its heating mode or its cooling mode in relation to the pressure value of the pneumatic signal means being directed thereto from said control means through said outlet means thereof, said control means having temperature sensing means for controlling said value of said signal means in relation to the sensed output temperature effect of said heat exchanger means by operating bleed means of said control means, the improvement wherein said bleed means comprises a single bleed device and said temperature sensing means comprises a pair of bimetal members for respectively acting on said single bleed device whereby said heat exchanger means is adapted to be operated in either its heating mode by one of said bimetal members or its cooling mode by the other of said bimetal members.

12. A system as set forth in claim 11 wherein said sensing means has means providing a "dead band" temperature range so that said bleed device will remain in a certain condition thereof to provide said signal means with a certain value as long as said sensed output temperature effect falls within said "dead band" temperature range.

13. A system as set forth in claim 12 wherein said means providing said "dead band" range is adjustable to increase or decrease said "dead band" range.

14. A system as set forth in claim 12 wherein said bleed device includes a leaf spring and a vent valve member engaged by said leaf spring to tend to normally provide said certain condition, said pair of bimetal members being operatively associated with said leaf spring and being adapted to be engageable therewith.

15. A system as set forth in claim 14 wherein said leaf spring has lost motion means operatively interconnecting said bimetal members and said leaf spring together.

16. A system as set forth in claim 15 wherein said lost motion means comprises opening means through said leaf spring, said bimetal members projecting through said opening means to either engage said leaf spring or be spaced therefrom in said opening means.

17. A system as set forth in claim 16 wherein said leaf spring has opposed ends one of which is secured to said control means to cantilever said leaf spring thereto, the other of said ends of said leaf spring engaging said vent valve member and having said opening means therethrough, each bimetal member having opposed ends one of which is secured to said control means to cantilever the respective bimetal member thereto, the other of said ends of each bimetal member projecting through said opening means, said bimetal members being disposed in spaced apart and in parallel relation to each other and to said leaf spring.

18. A system as set forth in claim 17 and including a pair of selector means carried by said unit and being respectively operatively interconnected to said bimetal members to adjust the same and thereby select the span of said "dead band" temperature range.

19. In a method of making a pneumatically operated system having control means provided with a single inlet interconnected to a one pressure level pneumatic source and having outlet means interconnected to pneumatically operated heating and cooling heat exchanger means to control the same in either its heating mode or its cooling mode in relation to the pressure value of the pneumatic signal means being directed thereto from said control means through said outlet means thereof, said control means having temperature sensing means for controlling said value of said signal means in relation to the sensed output temperature effect of said heat exchanger means by operating bleed means of said control means, the improvement comprising the steps of forming said outlet means to comprise a single bleed device having an arrangement of parts thereof that is the same regardless of whether said heat exchanger means is operating in its heating mode or in its cooling mode whereby said heat exchanger means is adapted to be operated in either its heating mode or its cooling mode by said single bleed device without changing said arrangement of said parts of said bleed means.

20. In a method of making a pneumatically operated system having control means provided with inlet means interconnected to pneumatic source means and having outlet means interconnected to pneumatically operated heating and cooling heat exchanger means to control the same in either its heating mode or its cooling mode in relation to the pressure value of the pneumatic signal means being directed thereto from said control means through said outlet means thereof, said control means having temperature sensing means for controlling said value of said signal means in relation to the sensed output temperature effect of said heat exchanger means by operating bleed means of said control means, the improvement comprising the steps of forming said bleed means to comprise a single bleed device, and forming said temperature sensing means to comprise a pair of bimetal members for respectively acting on said single bleed device whereby said heat exchanger means is adapted to be operated in either its heating mode by one of said bimetal members or its cooling mode by the other of said bimetal members.

21. In a pneumatically operated self-contained control unit having a single inlet for being interconnected to a one pressure level pneumatic source and having outlet means for being interconnected to pneumatically operated heating and cooling heat exchanger means to control the same in either its heating mode or its cooling mode in relation to the pressure value of the pneumatic signal means being directed thereto from said unit through said outlet means thereof, said unit having temperature sensing means for controlling said value of said signal means in relation to the sensed output temperature effect of said heat exchanger means by operating bleed means of said unit, the improvement wherein said outlet means comprises a single outlet and said bleed means comprises a single bleed device having an arrangement of parts thereof that is the same regardless of whether said heat exchanger means is to be operating in its heating mode or in its cooling mode whereby said heat exchanger means is adapted to be operated in either its heating mode or its cooling mode by said single bleed device without changing said arrangement of said parts of said bleed means when said unit is interconnected by said single inlet to said one pressure level pneumatic source.

22. In a pneumatically operated self-contained control unit having a single inlet for being interconnected to a one pressure level pneumatic source and having outlet means for being interconnected to pneumatically operated heating and cooling heat exchanger means to control the same in either its heating mode or its cooling mode in relation to the pressure value of the pneumatic signal means being directed thereto from said unit through said outlet means thereof, said unit having temperature sensing means for controlling said value of said signal means in relation to the sensed output temperature effect of said heat exchanger means by operating bleed means of said unit, the improvement wherein said outlet means comprises a single outlet and said bleed means comprises a single bleed device whereby said heat exchanger means is adapted to be operated in either its heating mode or its cooling mode by said single bleed device when said unit is interconnected by said single inlet to said one pressure level pneumatic source, said sensing means having means providing a "dead band" temperature range so that said bleed device will remain in a certain condition thereof to provide said pneumatic signal means with a certain value as long as said sensed output temperature effect falls within said "dead band" temperatue range.

23. A control unit as set forth in claim 22 wherein said means providing said "dead band" range is adjustable to increase or decrease said "dead band" range.

24. A control unit as set forth in claim 22 wherein said means providing said "dead band" range includes a pair of bimetal members respectively for use in connection with said heating mode and said cooling mode of said heat exchanger means.

25. A control unit as set forth in claim 22 wherein said bleed device includes a leaf spring and a vent valve member engaged by said leaf spring to tend to normally provide said certain condition.

26. A control unit as set forth in claim 25 wherein said means providing said "dead band" range includes a pair of bimetal members operatively associated with said leaf spring and being adaptable to be engageable therewith.

27. A control unit as set forth in claim 26 wherein said leaf spring has lost motion means operatively interconnecting said bimetal members and said leaf spring together.

28. A control unit as set forth in claim 27 wherein said lost motion means comprises opening means through said leaf spring, said bimetal member projecting through said opening means to either engage said leaf spring or be spaced therefrom in said opening means.

29. A control unit as set forth in claim 28 wherein said leaf spring has opposed ends one of which is secured to said unit to cantilever said leaf spring thereto, the other of said ends of said leaf spring engaging said vent valve member and having said opening means therethrough, each bimetal member having opposed ends one of which is secured to said unit to cantilever the respective bimetal member thereto, the other of said ends of each bimetal member projecting through said opening means, said bimetal members being disposed in spaced apart and in parallel relation to each other and to said leaf spring.

30. A control unit as set forth in claim 29 and including a pair of selector means carried by said unit and being respectively operatively interconnected to said bimetal members to adjust the same and thereby select the span of said "dead band" temperature range.

31. In a pneumatically operated self-contained control unit having inlet means for being interconnected to pneumatic source means and having outlet means for being interconnected to pneumatically operated heating and cooling heat exchanger means to control the same in either its heating mode or its cooling mode in relation to the pressure value of the pneumatic signal means being directed thereto from said unit through said outlet means thereof, said unit having temperature sensing means for controlling said value of said signal means in relation to the sensed output temperature effect of said heat exchanger means by operating bleed means of said unit, the improvement wherein said bleed means comprises a single bleed device and said temperature sensing means comprises a pair of bimetal members for respectively acting on said single bleed device whereby said heat exchanger means is adapted to be operated in either its heating mode by one of said bimetal members or its cooling mode by the other of said bimetal members when said unit is interconnected by said inlet means to said pneumatic source means.

32. A control unit as set forth in claim 31 wherein said sensing means has means providing a "dead band" temperature range so that said bleed device will remain in a certain condition thereof to provide said pneumatic signal means with a certain value as long as said sensed output temperature effect falls within said "dead band" temperature range.

33. A control unit as set forth in claim 32 wherein said means providing said "dead band" range is adjustable to increase or decrease said "dead band" range.

34. A control unit as set forth in claim 32 wherein said bleed device includes a leaf spring and a vent valve member engaged by said leaf spring to tend to normally provide said certain condition, said pair of bimetal members being operatively associated with said leaf spring and being adaptable to be engageable therewith.

35. A control unit as set forth in claim 34 wherein said leaf spring has lost motion means operatively interconnecting said bimetal members and said leaf spring together.

36. A control unit as set forth in claim 35 wherein said lost motion means comprises opening means through said leaf spring, said bimetal members projecting through said opening means to either engage said leaf spring or be spaced therefrom in said opening means.

37. A control unit as set forth in claim 36 wherein said leaf spring has opposed ends one of which is secured to said unit to cantilever said leaf spring thereto, the other of said ends of said leaf spring engaging said vent valve member and having said opening means therethrough, each bimetal member having opposed ends one of which is secured to said unit to cantilever the respective bimetal member thereto, the other of said ends of each bimetal member projecting through said opening means, said bimetal members being disposed in spaced apart and in parallel relation to each other and to said leaf spring.

38. A control unit as set forth in claim 37 and including a pair of selector means carried by said unit and being respectively operatively interconnected to said bimetal members to adjust the same and thereby select the span of said "dead band" temperature range.

39. In a method of making a pneumatically operated self-contained control unit having a single inlet for being interconnected to a one pressure level pneumatic source and having outlet means for being interconnected to pneumatically operated heating and cooling heat exchanger means to control the same in either its heating mode or its cooling mode in relation to the pressure value of the pneumatic signal means being directed thereto from said unit through said outlet means thereof, said unit having temperature sensing means for controlling said value of said signal means in relation to the sensed output temperature effect of said heat exchanger means by operating bleed means of said unit, the improvement comprising the steps of forming said outlet means to comprise a single outlet, and forming said bleed means to comprise a single bleed device having an arrangement of parts thereof that is the same regardless of whether said heat exchanger means is to be operating in its heating mode or in its cooling mode whereby said heat exchanger means is adapted to be operated in either its heating mode or its cooling mode by said single bleed device without changing said arrangement of said parts of said bleed means when said unit is interconnected by said single inlet to said one pressure level pneumatic source.

40. In a method of making a pneumatically operated self-contained control unit having inlet means for being interconnected to pneumatic source means and having outlet means for being interconnected to pneumatically operated heating and cooling heat exchanger means to control the same in either its heating mode or its cooling mode in relation to the pressure value of the pneumatic signal means being directed thereto from said unit through said outlet means thereof, said unit having temperature sensing means for controlling said value of said signal means in relation to the sensed output temperature effect of said heat exchanger means by operating bleed means of said unit, the improvement comprising the steps of forming said bleed means to comprise a single bleed device, and forming said temperature sensing means to comprise a pair of bimetal members for respectively acting on said single bleed device whereby said heat exchanger means is adapted to be operated in either its heating mode by one of said bimetal members or its cooling mode by the other of said bimetal members when said unit is interconnected by said inlet means to said pneumatic source means.

* * * * *

UNITED STATES PATENT AND TRADEMARK OFFICE
CERTIFICATE OF CORRECTION

PATENT NO. : 4,296,795
DATED : October 27, 1981
INVENTOR(S) : Jay L. Lewis

It is certified that error appears in the above—identified patent and that said Letters Patent is hereby corrected as shown below:

Column 11, line 65, after "single" insert --outlet, and forming said bleed means to comprise a single Signed and Sealed this Nineteenth Day of January 1982

[SEAL]

Attest:

Attesting Officer

GERALD J. MOSSINGHOFF
Commissioner of Patents and Trademarks